(12) United States Patent
Aitken et al.

(10) Patent No.: US 8,950,615 B2
(45) Date of Patent: Feb. 10, 2015

(54) VEHICLE FUELING APPARATUS

(71) Applicant: Ford Global Technologies LLC, Dearborn, MI (US)

(72) Inventors: Brian Thomas Aitken, Livonia, MI (US); Shahid Ahmed Siddiqui, Northville, MI (US); Paul Chretien, Commerce Township, MI (US); Dennis Seung-Man, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/729,717

(22) Filed: Dec. 28, 2012

(65) Prior Publication Data

US 2014/0183192 A1   Jul. 3, 2014

(51) Int. Cl.
*B65D 3/00* (2006.01)
*B65D 47/02* (2006.01)
*B65B 1/04* (2006.01)
*B60K 15/04* (2006.01)

(52) U.S. Cl.
CPC ........................................ *B60K 15/04* (2013.01)
USPC ........................... 220/86.2; 220/86.1; 141/350

(58) Field of Classification Search
CPC ................... B60K 2015/0429; B60K 15/0458; B60K 2015/0458; B60K 2015/0461
USPC .......... 220/86.1–86.3; 222/478; 141/350, 392; 137/377, 312
See application file for complete search history.

(56) References Cited

U.S. PATENT DOCUMENTS

| 7,055,560 | B1 | 6/2006 | Sexton | |
| 7,640,954 | B2* | 1/2010 | Bar | 141/350 |
| 8,714,213 | B2* | 5/2014 | Girgenrath | 141/350 |
| 8,714,214 | B2* | 5/2014 | Cisternino | 141/350 |
| 2010/0295332 | A1* | 11/2010 | Benjey | 296/97.22 |
| 2012/0211489 | A1* | 8/2012 | Walser et al. | 220/86.2 |
| 2013/0340866 | A1* | 12/2013 | Sasaki | 137/561 R |

FOREIGN PATENT DOCUMENTS

| CA | 2406758 | | 4/2003 |
| DE | 102008054493 | A1 * | 7/2009 |
| EP | 1854653 | A1 | 11/2007 |
| JP | 2012144152 | | 2/2012 |

* cited by examiner

*Primary Examiner* — Robert J Hicks
*Assistant Examiner* — Shawn M Braden
(74) *Attorney, Agent, or Firm* — James Dottavio; MacMillan, Sobanski & Todd, LLC

(57) ABSTRACT

A capless nozzle for a vehicle fuel filler canal, includes a conical portion; and a non-conical portion having a stop formed therein configured to limit travel of a filler pipe in one direction when the pipe is inserted in the filler canal.

12 Claims, 5 Drawing Sheets

VEHICLE FUELING APPARATUS

TECHNICAL FIELD

The present disclosure relates to vehicle fueling apparatuses and capless nozzles for the same.

BACKGROUND

Modern vehicles have capless fueling systems that enable a vehicle user to access a fuel tank without removal of a cap sealing a filler line for the fueling system. This can be accomplished with the use of pivoting doors that open and close when a filler pipe is inserted in the filler line. Alignment of a fuel station filler pipe needs to be more consistent. The filler pipe has a tendency to pitch upward or downward with respect to the filler canal. A misaligned fuel pipe can cause premature fuel-shut off at the fueling station.

In the past some designs have incorporated an elongated nozzle to assist in guiding the filler pipe. However, additional guide methods are required to accomplish more precise alignment of the filler pipe. Other designs have incorporated a torsional spring to bias pivoting doors towards a closed position so as to force the filler pipe into alignment. See, for example, Canadian Patent No. 2,406,758 titled "Capless Refueling Assembly with Dampened Flap Door and Baffle." The expense and maintenance of added parts, however, makes this option less feasible for mass production.

Therefore, it is desirable to have a vehicle fueling apparatus with improved guide techniques for the filler pipe.

SUMMARY

The present disclosure addresses one or more of the above-mentioned issues. Other features and/or advantages will become apparent from the description which follows.

One advantage of the present disclosure is that improved guide techniques are taught herein. A stop is formed in the nozzle to act as a passive limiting component for guiding the filler pipe. The stop thus presents a less complex and less expensive means for directing the filler pipe than prior methods. Hence, premature fuel shut offs and other alignment issues are mitigated by the present teachings.

One exemplary embodiment of the present disclosure relates to a capless nozzle for a vehicle fuel filler canal, including: a conical portion; and a non-conical portion having a stop formed therein configured to limit travel of a filler pipe in one direction when the pipe is inserted in the filler canal.

Another exemplary embodiment of the present disclosure relates to a vehicle fueling apparatus, including: a housing defining a filler canal configured to receive a filler pipe; a pivotal door attached to the housing; and a capless nozzle in the filler canal, having: a semi-conical portion and an open portion configured to receive the door when the door is in an opened position; and a stop configured to limit travel of the filler pipe in one direction when inserted in the filler canal.

Another exemplary embodiment of the present disclosure relates to a method of manufacturing a vehicle fueling apparatus, the method including: forming a housing defining a filler canal configured to receive a filler pipe; inserting a capless nozzle in the filler canal; attaching a pivotal door to the housing, configured to open an end of the filler canal when pivoted to an open position; and forming a stop in the capless nozzle, configured to limit travel of the filler pipe in one direction when the pipe is inserted in the filler canal.

The invention will be explained in greater detail below by way of example with reference to the figures, in which the same reference numbers are used in the figures for identical or essentially identical elements. The above features and advantages and other features and advantages of the present teachings are readily apparent from the following detailed description of the best modes for carrying out the invention when taken in connection with the accompanying drawings. In the figures:

DETAILED DESCRIPTION

Figure 1:
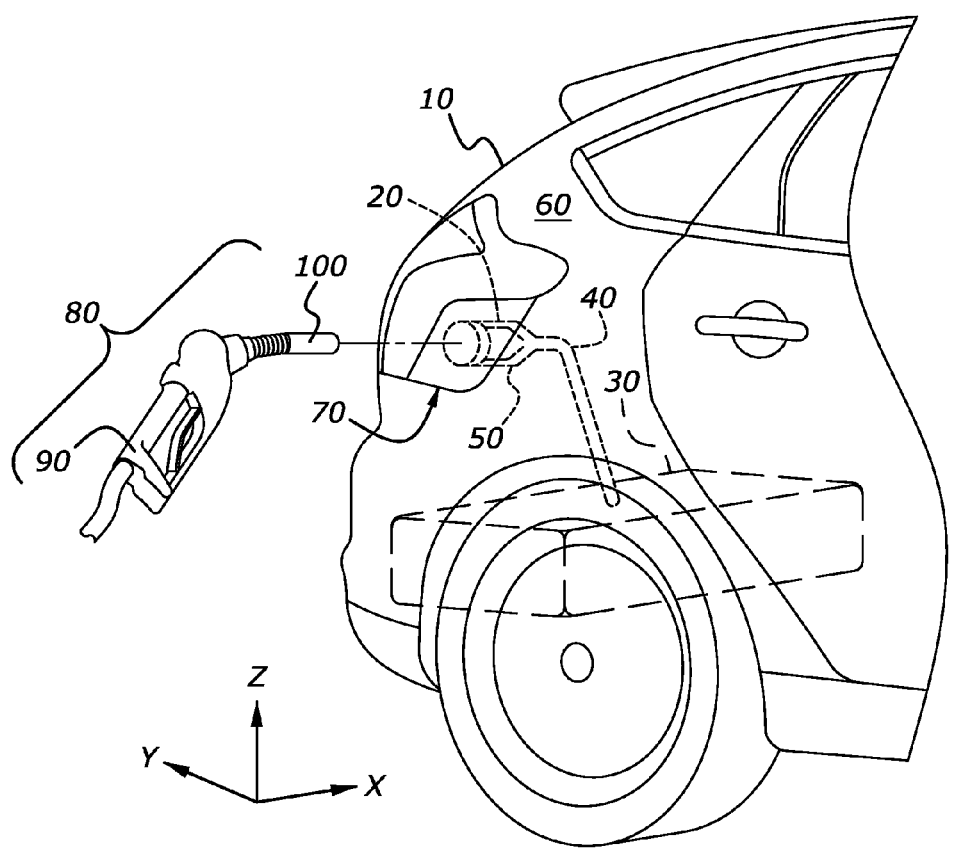
FIG. 1 is a partial perspective view of a fuel feed, a vehicle and an exemplary fueling apparatus.

Referring to the drawings, wherein like characters represent examples of the same or corresponding parts throughout the several views, there are shown exemplary vehicle fueling apparatuses for use with a motor vehicle. Any sort of vehicle can be used including sedans, convertibles, SUVs or pickup trucks. Also, motor vehicles and/or hybrid electric vehicles can utilize the present teachings.

The disclosed fueling apparatuses assist in vehicle refueling, enabling a fuel feed to provide fuel to a vehicle fuel tank. The exemplary fueling apparatuses discussed herein provide passive or inanimate guide techniques for aligning a filler pipe in the fueling apparatus. Rotation or travel of the filler pipe is limited by the guide techniques disclosed herein. In one embodiment, a stop is formed in a nozzle so as to limit travel of a pivotal door seal when the filler pipe is inserted in the fueling apparatus. The disclosed nozzle guide with hard stop causes an on-board refueling vapor recovery (or "ORVR") to be directed more concentric to an opening of the fuel filler pipe. This an ideal condition for optimal fuel fill quality. Other embodiments incorporate passive limiting devices on the filler pipe which can be incorporated in the apparatus housing, pivotal door or other locations.

Referring now to FIG. 1, there is shown therein a rear perspective view of a vehicle 10 compatible with the present teachings. The vehicle 10 includes a fueling apparatus 20 tied into a rear-mounted fuel tank 30 of the vehicle. A line 40 runs from fueling apparatus 20 to the fuel tank 30. Line 40 is attached to a housing 50 for the fueling apparatus 20 that is secured to a vehicle side panel 60. An access port 70 is formed in the body side panel 60. A door (not shown) is used to cover the access port 70. A fuel feed 80 is shown outside of the fueling apparatus 20. Fuel feed 80 includes a handle 90 for actuation and a filler pipe 100. Filler pipe 100 is insertable in the fuel apparatus housing 50 as shown and discussed, for example, with respect to FIG. 2.

Figure 2:
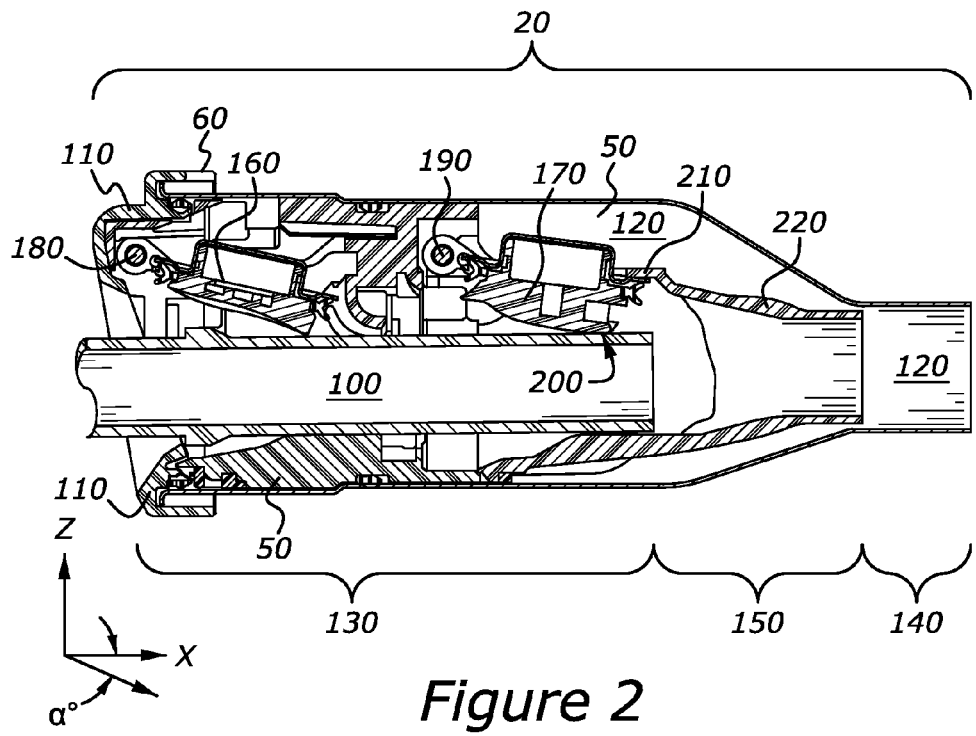
FIG. 2 is a cross-sectional view of the fueling apparatus of FIG. 1.

With respect to FIG. 2 there is shown a cross-sectional view of the fueling apparatus 20 of FIG. 1. Fueling apparatus 20 has the filler pipe 100 fitted or inserted therein. In this embodiment, filler pipe 100 extends across the longitudinal axis of the fueling apparatus 20 which is parallel to a lateral axis of the vehicle, or the x-axis, as shown. Fuel flow is directed along the positive x-axis. A fitting 110 is secured to the vehicle body panel 60. The fitting 110 acts as a seal. Fitting 110 is secured to fuel apparatus housing 50. Housing 50 encloses the components of the fueling apparatus 20 and defines a filler canal 120 therein. Housing 50 includes a main body 130 that is cylindrical in configuration and a narrower portion 140 with varying diameter. A conical portion 150 is between the main body 130 and the narrower portion 140. In the main body 130 a series of pivotal doors 160, 170 are attached to the housing 50. Door 160 is configured to pivot or rotate counterclockwise with respect to the y-axis, as shown in FIG. 1, about point 180. Door 170 is configured to pivot or rotate counterclockwise with respect to the y-axis about point 190. Each door 160, 170 in FIG. 2 is shown in an open position. When ajar doors 160, 170 open the filler canal 120, when closed, each door closes a portion or end of the filler canal.

On a bottom surface 200 of door 170 the filler pipe 100 rest adjacent the door. Filler pipe 100 movement or travel, with respect to the z-axis, as shown is thus limited by the position of door 170. Door 170 is angularly positioned by an angle alpha, $\alpha$, with respect to the main body 130 of housing 50 and/or the x-axis. A stop 210 is configured so that when in the opened position door 170 rests at a predetermined angle and filler pipe 100 is substantially parallel to the x-axis, thus causing the filler pipe to align horizontally inside the filler canal 120. In this embodiment, door 170 is pivoted approximately 10 degrees clockwise with respect to the y-axis. In other embodiments alpha can be less than or greater than 10 degrees. Door 170 is pivoted at approximately 3 o'clock with respect to the z-axis.

Filler pipe 100 is inserted in a capless nozzle 220 in the filler canal 120. Capless nozzle 220 is fitted in filler canal 120. On a top surface of nozzle 220 the stop 210 is formed therein. Stop 210 is configured to limit travel of door 170, thus limiting movement of filler pipe 100 through door. In this embodiment, stop 210 is a flange formed across an opened portion of nozzle, as discussed hereinbelow.

Figure 3:
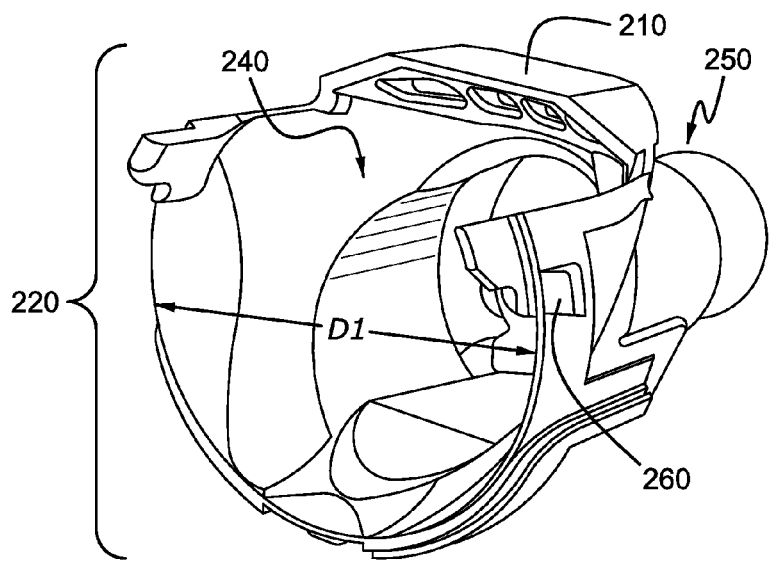
FIG. 3 is a rear perspective view of the capless nozzle of FIG. 2.
Figure 4:
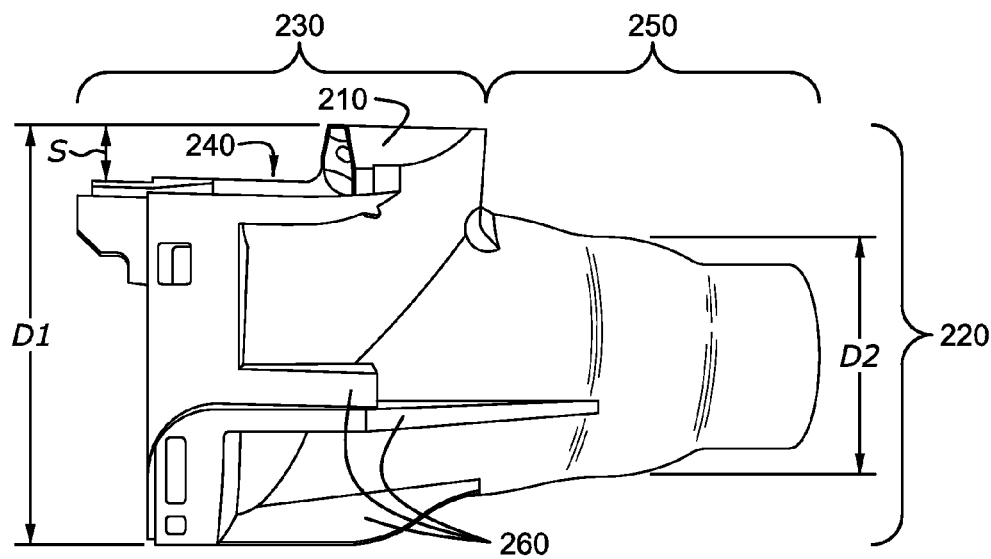
FIG. 4 is a side perspective view of the capless nozzle of FIG. 2.

Nozzle 220 is shown and discussed in more detail with respect to FIGS. 3 and 4. Nozzle 220 does not require a cap for fuel vapors as pivoting doors (160, 170 shown in FIG. 2) seal the fuel tank off when filler pipe 100 is removed from filler canal 120. Nozzle 220 of FIGS. 3-4 also includes a semi-conical portion 230; an open portion 240 is formed therein. Stop 210 is formed in the semi-conical portion 230 across a diameter, D1, of the semi-conical portion. A step, S, is formed between stop 210 and the open portion 240 of nozzle 220. Step, S, is approximately 10% of D1 in this embodiment. Nozzle 220 includes a conical portion 250 configured to sit in the deeper end of filler canal (120 as shown in FIG. 2). Conical portion 250 has another diameter defined by D2. In the illustrated embodiments of FIGS. 3 and 4, D2 is less than D1. Alignment features 260 for the nozzle 220 with respect to the housing 50 are formed on the exterior surface of nozzle.

With respect to this embodiment, as shown in FIGS. 3-4, nozzle 220 is formed via an injection molding process. Nozzle 220 is composed of a polymer. In other embodiments, nozzle 220 can be formed using other processes, such as stamping, cutting or welding. Nozzle 220 can also be formed from any material such as resins or metals.

Figure 5:
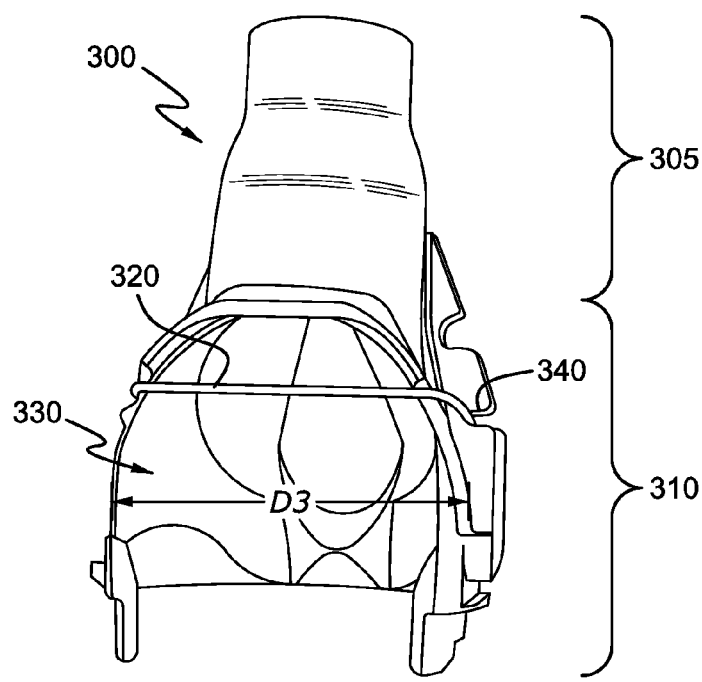
FIG. 5 is a top perspective view of another exemplary capless nozzle.

Now turning to FIG. 5, there is shown therein a top perspective view of another exemplary nozzle 300. Nozzle 300 is compatible with a housing and filler canal, for example as described with respect to FIG. 2. As shown in FIG. 5, nozzle 300 also includes a semi-conical portion; an open portion is also formed therein. Nozzle 300 also includes a conical portion 305. A stop is formed in the semi-conical portion 310 across a diameter, D3, of the semi-conical portion 310. Stop 320 includes a bar extending across an open portion 330 of nozzle 300. Bar 320 is threaded through guide lands 340 formed on the sides of nozzle 300. In this embodiment, guide lands 340 are grooves notched into the exterior surface of nozzle 300. Other guide lands can be used. Bar 320 is tied together at two ends in a middle section of the bar. With respect to this embodiment, as shown in FIG. 5, nozzle 300 can also be formed via an injection molding process and is composed of a polymer. Stop (or bar) 310 is composed of aluminum in the illustrated embodiment but can also be composed of other metals or polymers. Stop 320 can be anchored or secured to nozzle 300 with or without a fastener.

Figure 6:
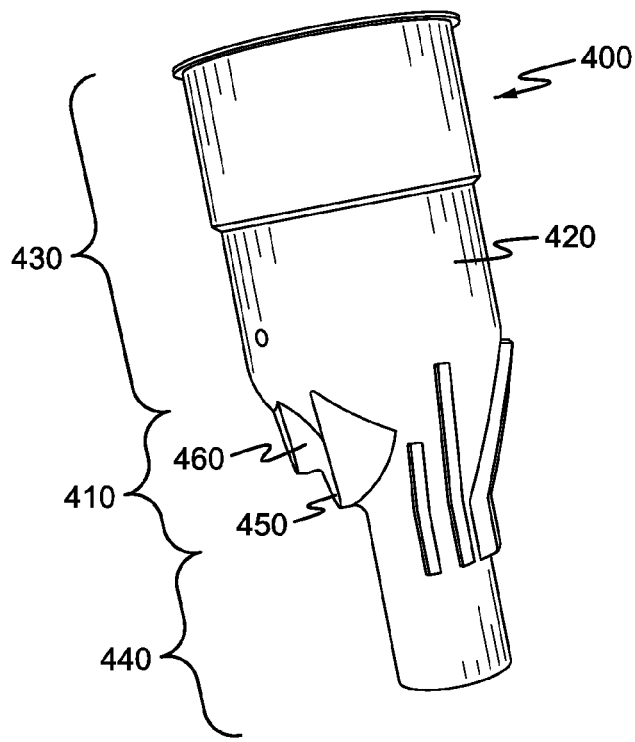
FIG. 6 is a side perspective view of a housing for another exemplary fueling apparatus.
Figure 7:
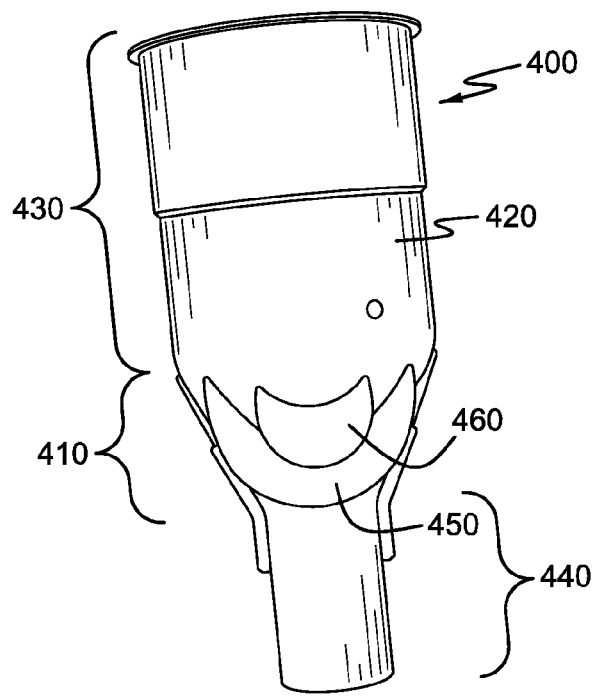
FIG. 7 is a top perspective view of the housing of FIG. 6.
Figure 8:
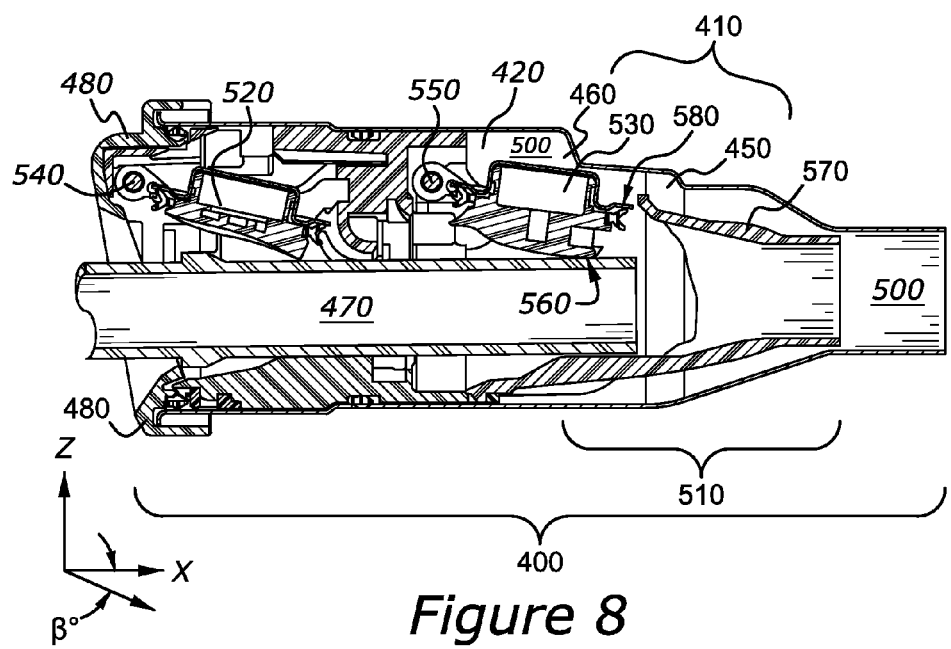
FIG. 8 is a cross-sectional view of a fueling apparatus having the housing of FIG. 6.

With reference now to FIGS. 6-8, there is shown therein another exemplary fueling apparatus 400. With the fueling apparatus 400 illustrated in FIGS. 6-8, a stop 410 is formed in a housing 420 for the fueling apparatus. Housing 420 includes a cylindrical portion 430 and a narrower portion 440. Stop 410 is configured to limit travel of a pivotal door and thus limit travel of a filler pipe. FIG. 6 shows a side perspective view of the housing 420 for fueling apparatus 400. Housing 420 includes a stop 410 that has formed therein a series of steps 450, 460 that limits travel of the pivotal door.

With respect to FIG. 8 there is shown a cross-sectional view of the fueling apparatus 400 of FIGS. 6 and 7. Fueling apparatus 400 has the filler pipe 470 fitted or inserted therein. In this embodiment, filler pipe 470 extends across the longitudinal axis of the fueling apparatus which is parallel to the lateral axis of the vehicle, or the x-axis. A fitting 480 is secured to a vehicle body panel 490. Fitting 480 is also secured to a housing 420. Housing 420 encloses the components of the fueling apparatus 400 and defines a filler canal 500 therein. Housing 420 includes a main body 430 that is cylindrical in configuration and a narrower portion 440, as shown in FIGS. 6-7. A conical portion 510 is between the main body 430 and the narrower portion 440. In the main body 430 a series of pivotal doors 520, 530 are attached to the housing. Door 520 is configured to pivot or rotate counterclockwise with respect to the y-axis, as shown in FIG. 1, about point 540. Door 530 is configured to pivot or rotate counterclockwise with respect to the y-axis about point 550. Each door 520, 530 is shown in an open position as shown.

On a bottom surface 560 of door 530 the filler pipe 470 rest adjacent the door 530. Filler pipe 470 movement or travel, with respect to the z-axis, as shown is thus limited by the position of door 530. Door 530 is angularly positioned by an angle beta, $\beta$, with respect to the main body 430 of housing 420 and/or the x-axis. Stop 410 is configured so that when in the opened position, door 530 rests at a predetermined angle and filler pipe 470 is substantially parallel to the x-axis. In this embodiment, door 530 is pivoted approximately 15 degrees clockwise with respect to the y-axis or at approximately 3 o'clock with respect to the z-axis. In other embodiments beta can be less than or greater than 15 degrees.

Filler pipe 470 is inserted in a capless nozzle 570 in the filler canal 500. Capless nozzle 570 is fitted in filler canal 500. On a top surface of nozzle 570 an open portion 580 is formed therein. Nozzle 570 can or cannot include a secondary stop feature formed therein.

In other embodiments other features on the fueling apparatus can include a stop formed therein to restrict movement of the pivotal door and/or filler pipe. In one embodiment a protrusion is formed on the fuel-tank side of a pivotal door so that counterclockwise rotation of door is restricted to a position that aligns filler pipe horizontally with respect to the vehicle or x-axis.

Turning now to methods of manufacturing a vehicle fueling apparatus. One embodiment of a method of manufacturing a vehicle fueling apparatus, includes the steps of: (i) forming a housing defining a filler canal configured to receive a filler pipe; (ii) inserting a capless nozzle in the filler canal; (iii) attaching a pivotal door to the housing, configured to seal one end of the filler canal when closed; and (iv) forming a stop in the capless nozzle, configured to limit travel of the filler pipe in one direction when the pipe is inserted in the filler canal. Exemplary stops 210, 320 and 410 are show and discussed with respect to FIGS. 2 thru 8. The method can include forming the capless nozzle or receiving the capless nozzle (e.g., 220, 300 and 570 as shown in FIGS. 2 thru 5 and 8). Where the method includes forming the capless nozzle the nozzle can be formed, for example, via injection molding.

In one embodiment, e.g., as shown in FIGS. 2 thru 4 stop includes forming a flange. In another embodiment, e.g., as shown in FIG. 5, forming the stop includes extending a bar across a portion of the nozzle; and threading the bar through a land 340 formed on an exterior surface of the nozzle.

Nozzle manufacture can also include forming an open portion in the capless nozzle, the open portion configured to at least partially fit the pivotal door therein when the door is rotated to an open position. An open portion is shown, for example, as 240 in FIGS. 3 thru 4, 330 in FIGS. 5 and 580 in FIG. 8.

Those familiar with the art to which this invention relates will recognize various alternative designs and embodiments for practicing the invention within the scope of the appended claims.

We claim:

1. A capless nozzle for a vehicle fuel filler canal, comprising:
    a conical portion having an exit end for coupling the nozzle to a fuel line running to a fuel tank, wherein the conical portion has a first diameter opening at an entrance end, a second diameter opening adjacent the exit end, and a varying diameter along a longitudinal axis between the first and second diameter openings, wherein the first diameter opening is larger than the second diameter opening; and
    a non-conical portion formed adjacent the first diameter opening and receiving a pivoting door for selectably sealing the non-conical portion, the non-conical portion having a stop formed therein configured to limit travel of the pivoting door when deflected by a filler pipe inserted in the non-conical portion in order to align the filler pipe against a side of the non-conical portion and parallel with the longitudinal axis;
    whereby the conical portion guides a fuel flow received from the aligned filler pipe into the exit end and to the fuel line without backup that causes premature fuel shutoff.

2. The nozzle of claim 1, wherein the non-conical portion includes an open portion.

3. The nozzle of claim 2, wherein the stop is a flange formed across the open portion of the nozzle.

4. The nozzle of claim 2,
    wherein the stop is formed across the first diameter opening, at least a 10% step into the first diameter opening.

5. The nozzle of claim 1, wherein the stop is a bar extending across the non-conical portion of the nozzle.

6. The nozzle of claim 5, further comprising:
    a land formed on an exterior surface of the nozzle configured to fit the bar therethru.

7. The nozzle of claim 1, wherein the nozzle is composed of a polymer.

8. A vehicle fueling apparatus, comprising:
    a housing defining a filler canal configured to receive a filler pipe;
    a pivotal door attached to the housing; and
    a capless nozzle in the filler canal, comprising:
        a conical portion having an exit end for coupling the nozzle to a fuel line running to a fuel tank, wherein the conical portion has a first diameter opening at an entrance end, a second diameter opening adjacent the exit end, and a varying diameter along a longitudinal axis between the first and second diameter openings, wherein the first diameter opening is larger than the second diameter opening; and
        a non-conical portion formed adjacent the first diameter opening and receiving the pivotal door for selectably sealing the non-conical portion, the non-conical portion having a stop formed therein configured to limit travel of the pivotal door when deflected by the filler pipe inserted in the non-conical portion in order to align the filler pipe against a side of the non-conical portion and parallel with the longitudinal axis;
        whereby the conical portion guides the fuel flow received from the aligned filler pipe into the exit end and to the fuel line without backup that causes premature fuel shutoff.

9. The fueling apparatus of claim 8, wherein the stop is a flange formed across a portion of the nozzle.

10. The fueling apparatus of claim 8, wherein the stop is a bar extending across the open portion of nozzle.

11. The fueling apparatus of claim 10, wherein the nozzle comprises a land formed on an exterior surface of the nozzle configured to fit the bar therethru.

12. The fueling apparatus of claim 8, wherein the nozzle is composed of a polymer.

\* \* \* \* \*